(12) United States Patent
Tu

(10) Patent No.: US 10,705,295 B2
(45) Date of Patent: *Jul. 7, 2020

(54) OPTICAL SWITCH AND OPTICAL SWITCHING SYSTEM

(71) Applicant: HUAWEI TECHNOLOGIES CO., LTD., Shenzhen, Guangdong (CN)

(72) Inventor: Xin Tu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/262,585

(22) Filed: Jan. 30, 2019

(65) Prior Publication Data

US 2019/0170946 A1    Jun. 6, 2019

Related U.S. Application Data

(63) Continuation of application No. PCT/CN2017/075308, filed on Mar. 1, 2017.

(30) Foreign Application Priority Data

Aug. 1, 2016   (CN) .......................... 2016 1 0620912

(51) Int. Cl.
*G02B 6/35*   (2006.01)
*G02B 6/12*   (2006.01)

(52) U.S. Cl.
CPC .............. *G02B 6/3502* (2013.01); *G02B 6/12* (2013.01); *G02B 6/35* (2013.01); *G02B 6/354* (2013.01); *G02B 2006/12145* (2013.01)

(58) Field of Classification Search
CPC ...... G02B 6/35; G02B 6/3502; G02B 6/3504; G02B 6/3506; G02B 6/3508; G02B 6/351;

(Continued)

(56) References Cited

U.S. PATENT DOCUMENTS 5,226,099 A    7/1993 Mignardi et al.
5,367,584 A    11/1994 Ghezzo et al.
(Continued)

FOREIGN PATENT DOCUMENTS

CN    1068198 A    1/1993
CN    1540427 A    10/2004
(Continued)

OTHER PUBLICATIONS

Benjamin G. Lee et al, Monolithic Silicon Integration of Scaled Photonic Switch Fabrics, CMOS Logic, and Device Driver Circuits. Journal of Lightwave Technology, vol. 32, No. 4, Feb. 15, 2014, 9 pages.

(Continued)

*Primary Examiner* — Robert Tavlykaev
(74) *Attorney, Agent, or Firm* — Fish & Richardson P.C.

(57) ABSTRACT

This application discloses an optical switch and an optical switching system. The optical switch includes a first waveguide, a second waveguide, and a first movable waveguide. The first waveguide and the second waveguide are immovable relative to a substrate. The first waveguide and the second waveguide are located in a first plane, and the first waveguide and the second waveguide do not intersect. The first movable waveguide is movable relative to the substrate. If the first movable waveguide is at a first location, the first movable waveguide is optically decoupled from the first waveguide and the second waveguide, and the optical switch is in a through state. If the first movable waveguide is at a second location, the first movable waveguide is optically coupled to the first waveguide and the second waveguide, and the optical switch is in a drop state.

16 Claims, 11 Drawing Sheets

(58) Field of Classification Search
CPC .............. G02B 6/12002; G02B 6/354; G02B 2006/12145
See application file for complete search history.

(56) References Cited

U.S. PATENT DOCUMENTS

| | | | |
|---|---|---|---|
| 6,198,856 B1* | 3/2001 | Schroeder | G02B 6/359 385/16 |
| 6,839,479 B2* | 1/2005 | Berger | G02B 6/12002 385/14 |
| 7,099,527 B2* | 8/2006 | Ogawa | G02B 6/3502 385/16 |
| 2002/0181855 A1 | 12/2002 | Xue et al. | |
| 2003/0107798 A1* | 6/2003 | Zhang | A61K 31/40 359/326 |
| 2003/0108274 A1* | 6/2003 | Haronian | G02B 6/122 385/17 |
| 2003/0108290 A1 | 6/2003 | Zhang et al. | |
| 2003/0231821 A1* | 12/2003 | Clarke | G02F 1/3132 385/17 |
| 2004/0062510 A1 | 4/2004 | Romo et al. | |
| 2016/0377805 A1* | 12/2016 | Ellis-Monaghan | G02B 6/1225 385/14 |

FOREIGN PATENT DOCUMENTS

| | | |
|---|---|---|
| CN | 1703637 A | 11/2005 |
| CN | 1764854 A | 4/2006 |
| EP | 1382984 A1 | 1/2004 |
| EP | 1606658 B1 | 3/2012 |
| WO | 03065413 A2 | 8/2003 |
| WO | 2015147966 A2 | 10/2015 |

OTHER PUBLICATIONS

Long Chen et al, Compact, low-loss and low-power 8×8 broadband silicon optical switch. Aug. 13, 2012 / vol. 20, No. 17 / Optics Express, 9 pages.
J. Kim, C et al, 1100 * 1100 Port MEMS-Based Optical Crossconnect With 4-dB Maximum Loss. IEEE Photonics Technology Letters, vol. 15, No. 11, Nov. 2003, 3 pages.
International Search Report and Written Opinion issued in International Application No. PCT/CN2017/075308 dated Jun. 5, 2017, 17 pages.
Chinese Office Action issued in Chinese Application No. 201610620912 dated Oct. 17, 2018, 5 pages.
Chinese Search Report issued in Chinese Application No. 2016106209128 dated Oct. 9, 2018, 2 pages.
Extended European Search Report issued in European Application No. 17836153.1 dated Jul. 23, 2019, 8 pages.

* cited by examiner

OPTICAL SWITCH AND OPTICAL SWITCHING SYSTEM

CROSS-REFERENCE TO RELATED APPLICATIONS

This application is a continuation of International Application No. PCT/CN2017/075308, filed on Mar. 1, 2017, which claims priority to Chinese Patent Application No. 201610620912.8, filed on Aug. 1, 2016. The disclosures of the aforementioned applications are hereby incorporated by reference in their entireties.

TECHNICAL FIELD

This application relates to the optical communications field, and more specifically, to an optical switch and an optical switching system.

BACKGROUND

Development of a dense wavelength division multiplexing (DWDM) technology has resulted in a continuous increase in an information transmission speed and capacity in an optical fiber communication link, and resulted in an increase in requirements for an information exchange speed and capacity in an optical communications network (for example, a metropolitan area network or a data center). An all-optical switching system becomes a development trend in the optical communications network. An optical switch is a key device for implementing the all-optical switching system. The optical switch can implement functions such as route selection, wavelength selection, optical cross-connection, and self-healing protection of an all-optical layer. Currently, an optical switch mainly includes a conventional mechanical optical switch, a micro-electro-mechanical system (MEMS) optical switch, a liquid crystal optical switch, a waveguide optical switch, a semiconductor optical amplifier optical switch, and the like.

A conventional MEMS optical switch is usually based on an electrostatic-actuation micro reflector structure, has advantages such as a low insertion loss, low crosstalk, a high extinction ratio, good scalability, and simple control, and may have at least 1000 ports in scale. However, because of a low rotation speed of a micro reflector, a switching speed of this type of optical switch usually can reach only a millisecond level, unable to meet a requirement for a future microsecond-level switch speed. Because a process of a silicon-based waveguide optical switch is compatible with a mature complementary metal oxide semiconductor (CMOS) process, the silicon-based waveguide optical switch has advantages such as low costs and high integration, and a large-scale optical switch matrix is easily to be implemented. A switching speed of the optical switch can reach a microsecond level by using a thermo-optic effect of silicon materials. However, the thermo-optic effect of silicon materials is relatively weak, and a refractive index changes slightly. Therefore, a Mach-Zehnder interferometer (MZI) structure needs to be used to implement a 1×2 or 2×2 optical switch. The large-scale optical switch matrix is formed by cascading optical switches. The optical switch of the MZI structure has a noticeable loss in both a drop state and a through state, and the loss increases rapidly with an increase in dimensions of the optical switch matrix. The silicon-based waveguide optical switch has a problem of a high insertion loss, and this restricts application of the silicon-based waveguide optical switch.

Therefore, implementing the optical switch matrix with a microsecond-level switching speed, a low insertion loss, a large quantity of ports, and low costs is an important part of future development of an all-optical switching technology.

SUMMARY

This application provides an optical switch and an optical switching system. The optical switch and the optical switching system have a high switching speed and a low loss.

According to a first aspect, this application provides an optical switch, where the optical switch is disposed on a substrate, and the optical switch includes a first waveguide, a second waveguide, and a first movable waveguide; the first waveguide is immovable relative to the substrate, and the first waveguide has a first input port IP1 and a first output port OP1; the second waveguide is immovable relative to the substrate, the second waveguide has a second output port OP2, the first waveguide and the second waveguide are located in a first plane, and the first waveguide and the second waveguide do not intersect; the first movable waveguide is movable relative to the substrate; when the first movable waveguide is at a first location, (1) the first movable waveguide and the first waveguide are optically decoupled, and the first movable waveguide and the second waveguide are optically decoupled; and (2) the IP1 and the OP1 are optically connected, and the IP1 and the OP2 are optically disconnected; and when the first movable waveguide is at a second location, (1) the first movable waveguide and the first waveguide are optically coupled, and the first movable waveguide and the second waveguide are optically coupled; and (2) the IP1 and the OP1 are optically disconnected, and the IP1 and the OP2 are optically connected by using the first movable waveguide.

According to a second aspect, this application provides an optical switching system, where the optical switching system is an M×N optical switch matrix, including M×N optical switches according to the first aspect, the second waveguide of the optical switch further has a second input port IP2, and each optical switch is denoted as $SC_{i,j}$, where a value of i is 1, 2, ..., M, and a value of j is 1, 2, ..., N; and the M×N optical switches are set as follows: (1) an $IP1_{i,j}$ and an $OP2_{i,j-1}$ are optically connected; and (2) an $IP2_{i,j}$ and an $OP1_{i-1,j}$ are optically connected, where a value range of i is 2 to M, and a value range of j is 2 to N.

DESCRIPTION OF EMBODIMENTS

The following describes the technical solutions in this application with reference to the accompanying drawings.

As mentioned in the foregoing description, to implement an optical switch matrix with a microsecond-level switching speed, a low insertion loss, a large quantity of ports, and low costs, the prior art provides an MEMS optical switch matrix based on a crossbar architecture.

Figure 1:
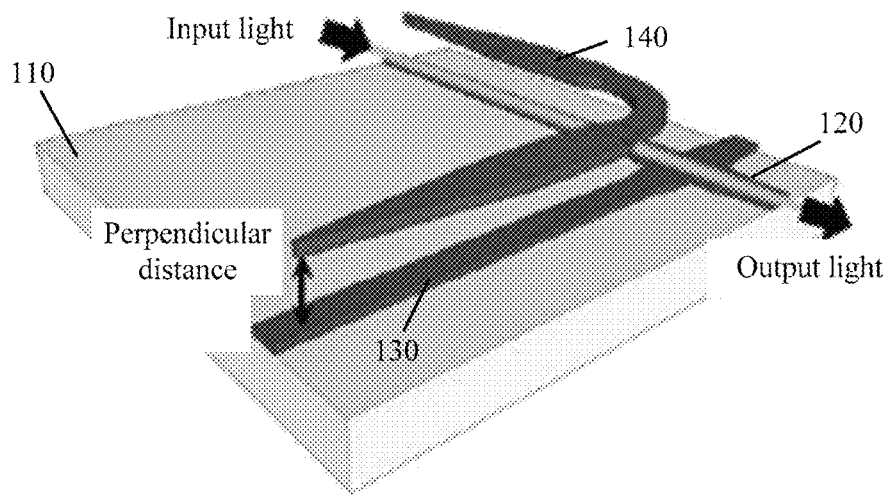
FIG. 1 and FIG. 2 are schematic diagrams of an existing optical switch in a through state and a drop state, respectively.
Figure 2:
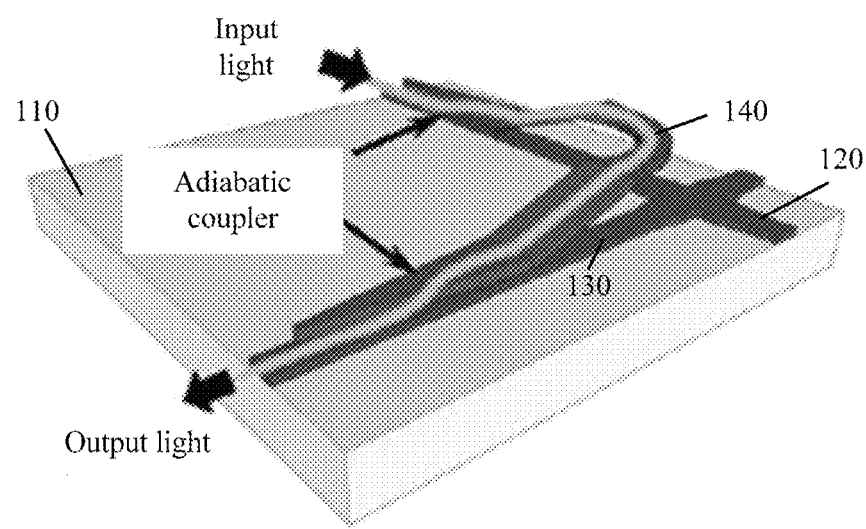

FIG. 1 and FIG. 2 are schematic diagrams of an optical switch 100 in the optical switch matrix in a through state and a drop state, respectively. The optical switch 100 in the optical switch matrix is based on a silicon-based optical waveguide, and includes an upper-layer optical waveguide and lower-layer optical waveguides. The lower-layer optical waveguides include two fixed crossed optical waveguides (a through waveguide 120 and a drop waveguide 130) that are fixed on a substrate 110, the upper-layer optical waveguide includes one shunting optical waveguide 140 that can perpendicularly move relative to the substrate 110, and the shunting optical waveguide 140 is actuated by using static electricity.

As shown in FIG. 1, when the optical switch 100 is in the through state, no voltage is applied to an actuator, perpendicular distances between the shunting optical waveguide 140 and the two fixed optical waveguides are relatively large, and the shunting optical waveguide 140 and the two fixed optical waveguides are not optically coupled. Input light is transmitted along the through waveguide 120 and perpendicularly intersects with the drop waveguide 130, and output light is output from the through waveguide 120. When the optical switch 100 is in the through state, a loss is at a level of 0.01 dB. As shown in FIG. 2, when the optical switch 100 is in the drop state, a voltage is applied to the actuator, the shunting optical waveguide 140 perpendicularly moves downwards, so that the perpendicular distances between the shunting optical waveguide 140 and the two fixed optical waveguides decrease, and the shunting optical waveguide 140 is optically coupled to both the fixed optical waveguides, thereby forming two adiabatic couplers that perform coupling in a perpendicular direction. Input light is first coupled from the through waveguide into the shunting optical waveguide 140 by using a first adiabatic coupler, and then coupled from the shunting optical waveguide 140 into the drop waveguide 130 by using a second adiabatic coupler, and output light is output from the drop waveguide 130. When the optical switch 100 is in the drop state, a loss is at a level of 1 dB. Because a silicon photonics technology is used, a device size of the optical switch 100 is significantly reduced in comparison with that of a conventional optical switch using an MEMS micromirror, and a switching speed reaches a 1-microsecond level.

Figure 3:
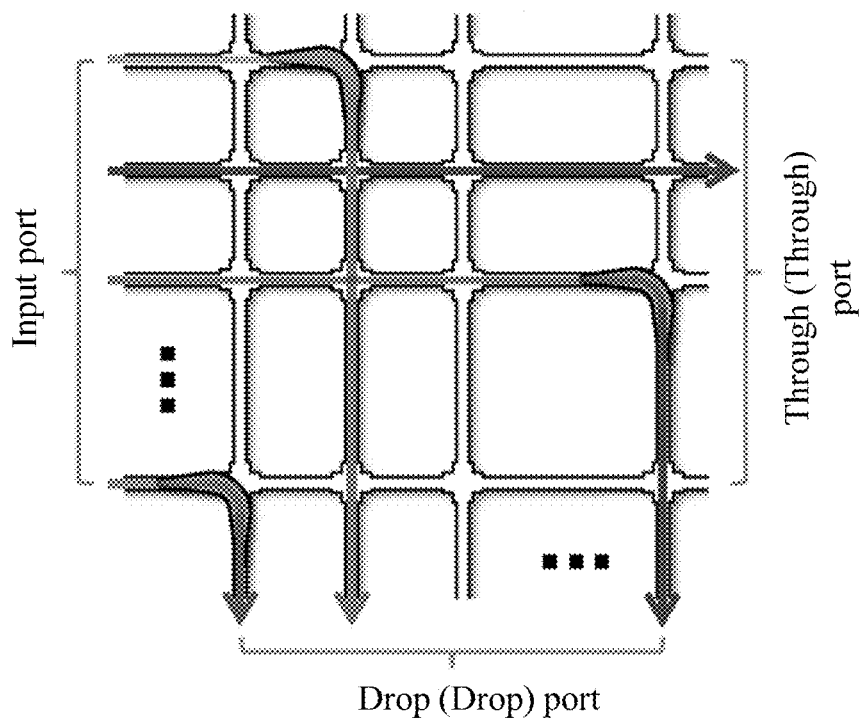
FIG. 3 is a schematic diagram of optical path switching of an optical switch matrix based on a crossbar architecture.

FIG. 3 is a schematic diagram of optical path switching of the MEMS optical switch matrix based on the crossbar architecture. As shown in FIG. 3, the optical switch matrix includes M×N optical switches, forming a matrix with M rows and N columns. The M×N optical switches each are located at an intersection of each row and each column. A first output port OP1 of one of N optical switches in each row is connected to a first input port IP1 of an adjacent optical switch. A first input port IP1 that is of an optical switch in the N optical switches in each row and that is connected to no first output port OP1 of another optical switch is an input port of the optical switch matrix. A first output port OP1 that is of an optical switch in the N optical switches in each row and that is connected to no first input port IP1 of another optical switch is a through port of the optical switch matrix. A second output port OP2 of one of M optical switches in each column is connected to a second input port IP2 of an adjacent optical switch. A second output port OP2 that is of an optical switch in the M optical switches in each column and that is connected to no second input port IP2 of another optical switch is a drop port of the optical switch matrix.

On each optical path of the optical switch matrix shown in FIG. 3, a maximum of one optical switch is in the drop state with a relatively high loss, and the remaining optical switches are in the through state with a very low loss. Therefore, when there are a relatively large quantity of ports, a loss caused by the MEMS optical switch matrix based on the crossbar architecture is much lower than that caused by a silicon-based optical switch of another type. The MEMS optical switch matrix based on the crossbar architecture has advantages such as low costs, a fast switching speed, a low insertion loss, and a large quantity of ports.

However, a loss may occur at an intersection of the two crossed optical waveguides that are located at a lower layer of the optical switch shown in FIG. 1 and FIG. 2. In addition, when the optical switch is in the drop state, an optical signal needs to undergo mode conversion at the two adiabatic couplers for a plurality of times, and needs to pass through a curved waveguide, causing a relatively high loss.

Figure 4:
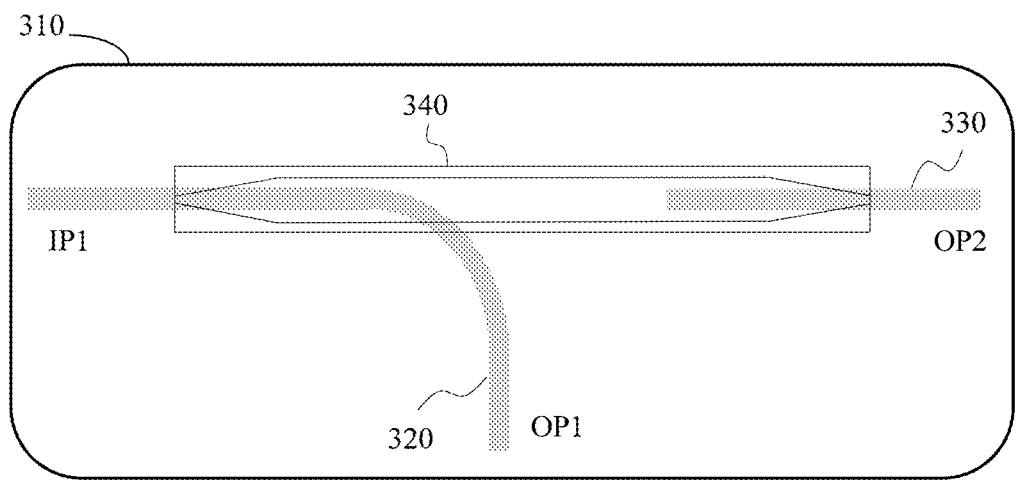
FIG. 4 is a schematic top block diagram of a structure of an optical switch according to an embodiment of this application.

In view of the foregoing problems, an embodiment of this application provides a microsecond-level optical switch 300 having a low insertion loss. As shown in FIG. 4, the optical switch 300 is disposed on a substrate 310, and the optical switch 300 includes a first waveguide 320, a second waveguide 330, and a first movable waveguide 340. The first waveguide 320 is immovable relative to the substrate 310, and the first waveguide 320 has a first input port IP1 and a first output port OP1. The second waveguide 330 is immovable relative to the substrate 310, and the second waveguide 330 has a second output port OP2. The first waveguide 320 and the second waveguide 330 are located in a first plane, and the first waveguide 320 and the second waveguide 330 do not intersect. The first movable waveguide 340 is movable relative to the substrate 310.

When the first movable waveguide 340 is at a first location, (1) the first movable waveguide 340 and the first waveguide 320 are optically decoupled, and the first movable waveguide 340 and the second waveguide 330 are optically decoupled; and (2) the IP1 and the OP1 are optically connected, and the IP1 and the OP2 are optically disconnected. When the first movable waveguide 340 is at a second location, (1) the first movable waveguide 340 and the first waveguide 320 are optically coupled, and the first movable waveguide 340 and the second waveguide 330 are optically coupled; and (2) the IP1 and the OP1 are optically disconnected, and the IP1 and the OP2 are optically connected by using the first movable waveguide 340.

Optionally, the first movable waveguide in this embodiment of this application may be an MEMS optical waveguide.

Optionally, it may be considered that, when the first movable waveguide 340 is at the first location, the optical switch is in a through state; and when the first movable waveguide 340 is at the second location, the optical switch is in a drop state.

Optionally, the first plane in this embodiment of this application may be a plane that is parallel with the substrate 310.

The optical switch in this embodiment of this application includes two uncrossed waveguides that are fixed on the substrate and one first movable waveguide that is movable relative to the substrate, so that a loss caused by intersection is avoided. In addition, when the optical switch is in both the states, an optical signal does not need to pass through both a coupler and a curved waveguide, but passes through only the coupler or only the curved waveguide, thereby further reducing a loss.

It should be understood that, that a waveguide X and a waveguide Y are optically coupled means that the waveguide X and the waveguide Y move close to each other, so that light fields of the two waveguides affect each other and light energy is transferred between the two waveguides. That the waveguide X and the waveguide Y are optically decoupled means that the waveguide X and the waveguide Y move away from each other, so that the light fields of the two waveguides do not affect each other and no light energy is transferred between the two waveguides. Certainly, it is inevitable that, when the waveguide X and the waveguide Y are optically decoupled, the light fields of the two waveguides may still slightly affect each other, and a small amount of light energy may be transferred between the two waveguides in a form of crosstalk. Such crosstalk should be as small as possible.

It should be further understood that, that an input port A and an output port B are optically connected means that an optical signal channel is established between the input port A and the output port B. Certainly, it is inevitable that, when the input port A and the output port B are optically connected, a small amount of light may be output from another output port different from the output port B in a form of crosstalk, or a small amount of light may be transmitted from another input port different from the input port A to the output port B in a form of crosstalk. Such crosstalk should be as small as possible.

It should be further understood that, that the input port A and the output port B are optically disconnected means that no optical signal channel exists between the input port A and the output port B. Certainly, it is inevitable that, when the input port A and the output port B are optically disconnected, a small amount of light may be transmitted from the input port A to the output port B in a form of crosstalk. Likewise, such crosstalk should be as small as possible.

Optionally, the first movable waveguide 340 and the first waveguide 320 being optically decoupled and the first movable waveguide 340 and the second waveguide 330 being optically decoupled may be results achieved simultaneously when the first movable waveguide 340 is adjusted and controlled to be at the first location, instead of being separately implemented in two steps. The first movable waveguide 340 and the first waveguide 320 being optically coupled and the first movable waveguide 340 and the second waveguide 330 being optically coupled may be similar to that, and details are not described.

It should also be understood that sizes and shapes of the substrate 310, the first waveguide 320, the second waveguide 330, and the first movable waveguide 340, and locations and directions of the IP1, the OP1, and/or the OP2 that are shown in FIG. 4 are all examples and constitute no limitation to this embodiment of this application. For brevity, the substrate 310 is omitted and not shown in embodiments in FIG. 5 to FIG. 19 in this application. The first waveguide 320 and the second waveguide 330 are fixed waveguides, or referred to as immovable waveguides. The first movable waveguide 340 and a second movable waveguide 360 that is to be mentioned below are movable waveguides.

Optionally, in an embodiment, the first movable waveguide 340 may not be located in the first plane, and the first movable waveguide 340 can perpendicularly move relative to the first plane or can deform in a direction perpendicular to the first plane. The first movable waveguide perpendicularly moves or deforms in the direction perpendicular to the first plane at a high speed, so that the optical switch has a relatively high switching speed.

Figure 5:
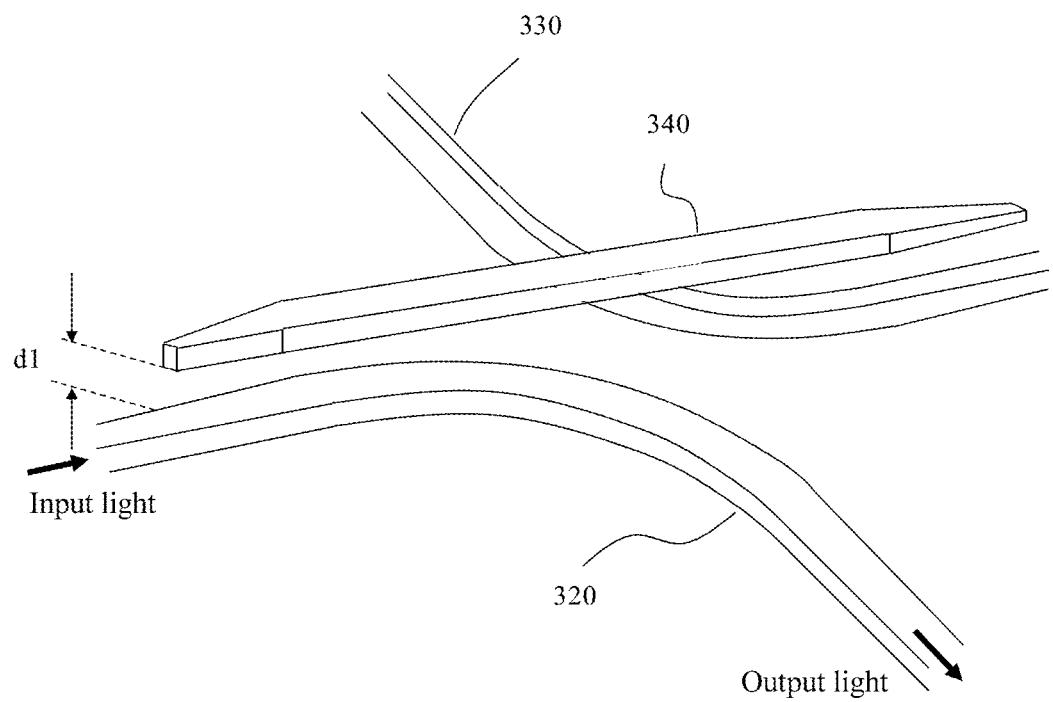
FIG. 5 is a schematic three-dimensional block diagram of an optical switch in a through state according to an embodiment of this application.
Figure 6:
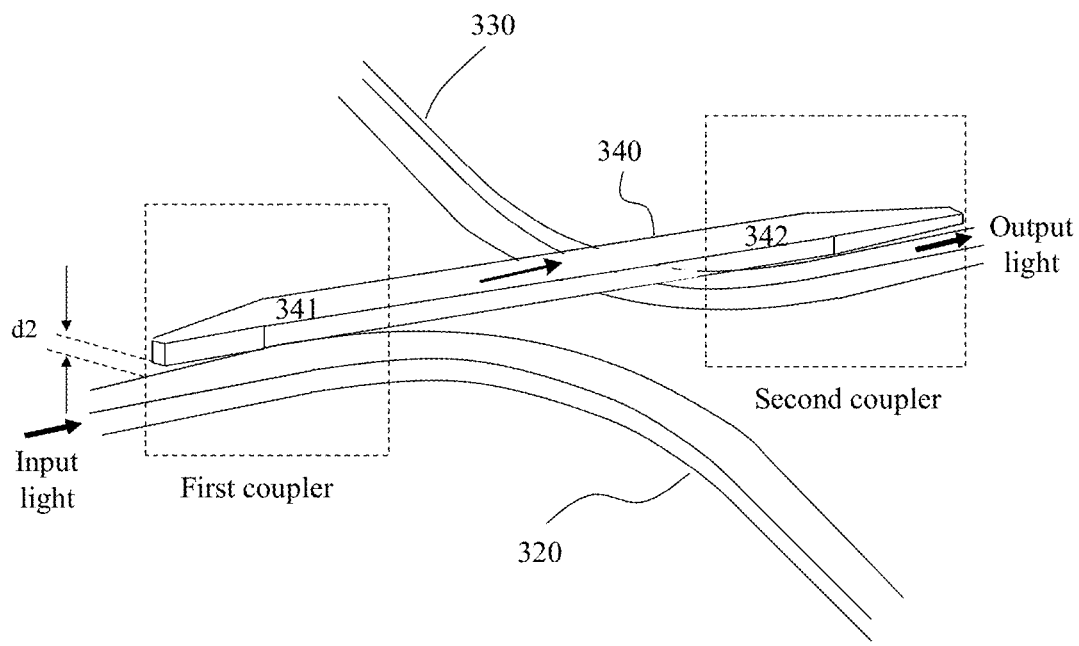
FIG. 6 is a schematic three-dimensional block diagram of an optical switch in a drop state according to an embodiment of this application.

Specifically, for example, the first movable waveguide 340 of the optical switch shown in FIG. 4 is not located in the first plane in which the first waveguide 320 and the second waveguide 330 are located, but is located in a second plane that is parallel with the first plane. FIG. 4 is a top view of the optical switch. FIG. 5 and FIG. 6 are three-dimensional views of the optical switch. The first waveguide 320 and the second waveguide 330 of the optical switch shown in FIG. 5 and FIG. 6 are both curved waveguides, and the first movable waveguide 340 is a straight waveguide. It should be understood that, shapes of the first waveguide 320, the second waveguide 330, and the first movable waveguide 340 are not limited to this.

FIG. 5 is a schematic diagram of the optical switch in a through state. As shown in FIG. 5, when the optical switch is in the through state, that is, when the first movable waveguide 340 is at the first location, a distance between the first movable waveguide 340 and the first waveguide 320 and a distance between the first movable waveguide 340 and the second waveguide 330 are d1, and the first movable waveguide 340 is optically decoupled from the first waveguide 320 and the second waveguide 330. The IP1 and the OP1 are optically connected, and the IP1 and the OP2 are optically disconnected. Input light is input from the first input port IP1 of the first waveguide 320 and is transmitted in the first waveguide 320, and output light is output from the first output port OP1 of the first waveguide 320.

FIG. 6 is a schematic diagram of the optical switch in a drop state. As shown in FIG. 6, when the optical switch is in the drop state, that is, when the first movable waveguide 340 is at the second location, a distance between the first movable waveguide 340 and the first waveguide 320 and a distance between the first movable waveguide 340 and the second waveguide 330 are d2, and the first movable waveguide 340 is optically coupled to the first waveguide 320 and the second waveguide 330, d1 is greater than d2. The IP1 and the OP1 are optically disconnected, and the IP1 and the OP2 are optically connected by using the first movable waveguide 340. Input light is input from the first input port IP1 of the first waveguide 320. Because the first movable waveguide 340 and the first waveguide 320 are optically coupled, an optical signal is coupled into the first movable waveguide 340 for transmission. In addition, because the first movable waveguide 340 and the second waveguide 330 are optically coupled, the optical signal is coupled into the second waveguide 330 for transmission. Finally, output light is output from the second output port OP2 of the second waveguide 330.

Specifically, as shown in FIG. 6, the first movable waveguide 340 in this embodiment of this application may include a first input section 341 and a first output section 342. When the first movable waveguide 340 is at the second location, the first input section 341 of the first movable waveguide 340 and the first waveguide 320 form a first coupler, and the first output section 342 of the first movable waveguide 340 and the second waveguide 330 form a second coupler. Because of the first coupler, the IP1 and the OP1 are optically disconnected, and because of the second coupler, the IP1 and the OP2 are optically connected. The input light is input from the first input port IP1 of the first waveguide 320. The optical signal is coupled by the first coupler into the first input section 341 of the first movable waveguide 340 for transmission, and is coupled by the second coupler from the first output section 342 of the first movable waveguide 340 into the second waveguide 330 for transmission. Finally, the output light is output from the second output port OP2 of the second waveguide 330.

Optionally, the first coupler may be set as follows: Along a transmission direction of the optical signal, a curvature degree change of the first waveguide in the first coupler is less than a first threshold, and a curvature degree change of the first input section of the first movable waveguide in the first coupler is less than a second threshold. That is, the first input section 341 of the first movable waveguide 340 and the first waveguide 320 are coupled on a straight waveguide as much as possible, so that an optical signal loss at the coupler can be reduced. The first threshold may be or may not be equal to the second threshold, and their values may be 5°, 10°, 15°, or 20°. A specific value may be determined based on a system requirement, waveguide performance, a mode and power of an optical signal, and the like. This is not limited in this embodiment of this application. Likewise, the second coupler may be designed similarly. This is not limited in this embodiment of this application.

Figure 7:
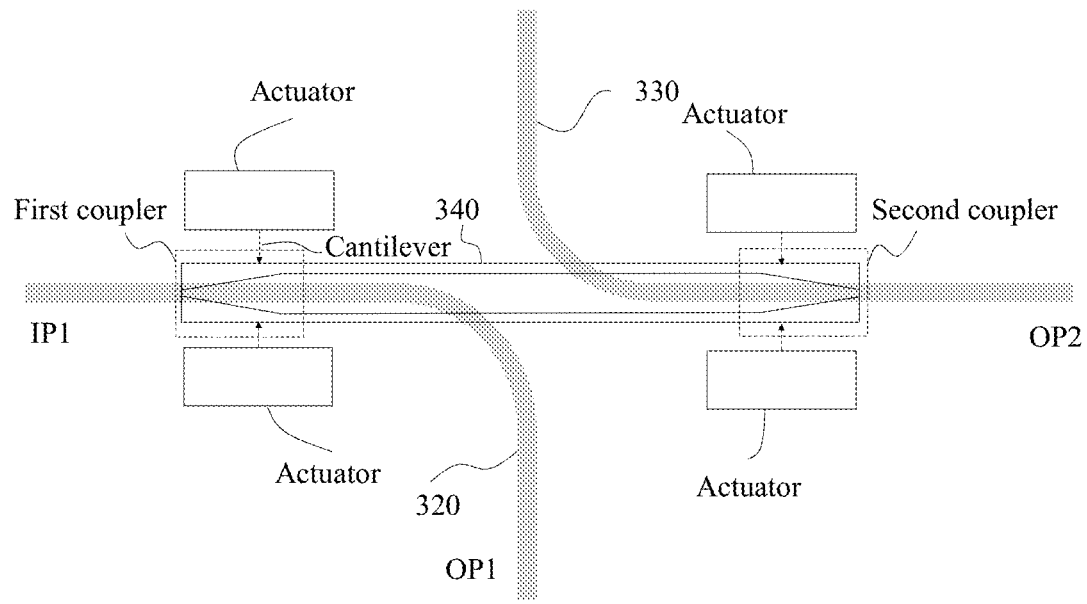
FIG. 7 is a schematic structural block diagram of an optical switch according to another embodiment of this application.

In this embodiment of this application, as shown in FIG. 7, the optical switch may further include at least one actuator, a location of the first movable waveguide is controlled by the at least one actuator, and the at least one actuator and the first movable waveguide are connected to each other by using a cantilever. The cantilever may be a spring, or may be another component in elastic materials, or may be an inelastic connecting component. This is not limited in this embodiment of this application.

Figure 9:
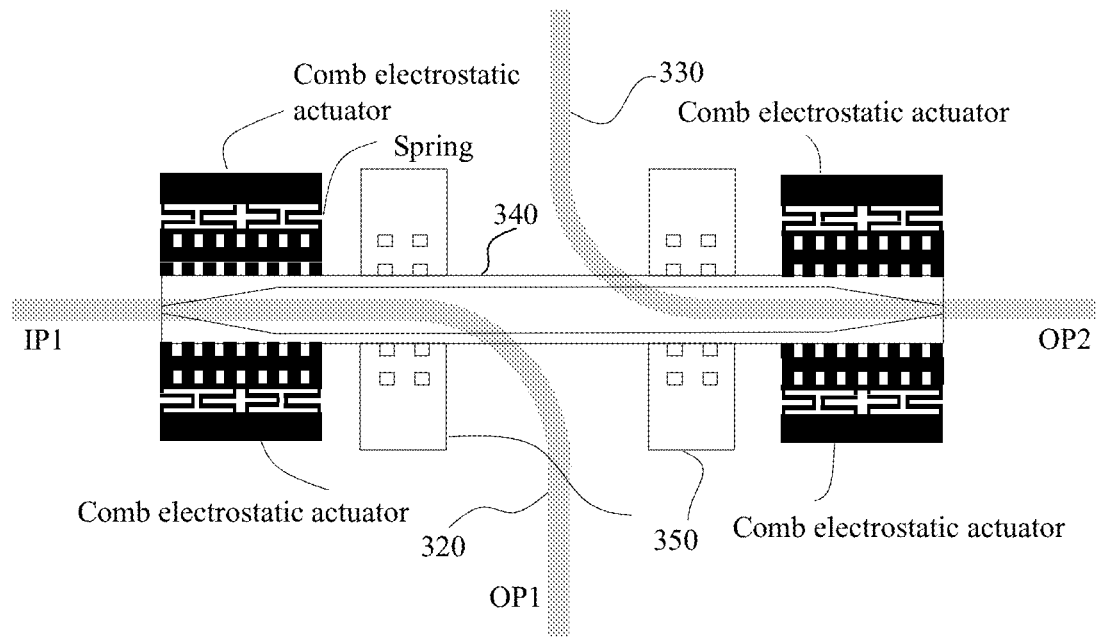
FIG. 9 is a schematic structural block diagram of an optical switch according to another embodiment of this application.

The actuator may be excited by an electric field, a magnetic field, a light field, a thermal field, or the like, and the actuator drives, under the foregoing excitation, the first movable waveguide to move. The actuator may be a parallel-plate electrostatic actuator or a comb electrostatic actuator (as shown in FIG. 9), or may be an actuator of another type. This is not limited in this embodiment of this application. Locations and a quantity of disposed actuators are not limited either.

According to the optical switch shown in FIG. 7, when no voltage is applied to the actuator, no electrostatic attraction exists between an upper electrode and a lower electrode in the actuator, perpendicular distances between the first movable waveguide at an upper layer and the fixed waveguides at a lower layer are relatively large (for example, d1), and the optical switch is in a through state. An optical signal in the fixed waveguide at the lower layer is not coupled into the first movable waveguide at the upper layer, and is directly output from a port of the fixed waveguide at the lower layer. When a voltage is applied to the actuator, electrostatic attraction is generated between the upper electrode and the lower electrode in the actuator, and displacement occurs. The actuator drives the first movable waveguide at the upper layer to move to a location with relatively small perpendicular distances (for example, d2) from the fixed waveguides at the lower layer, and the optical switch is in a drop state. An optical signal in the fixed waveguide at the lower layer is coupled into the first movable waveguide at the upper layer for transmission, and is then coupled back into a port of the fixed waveguide at the lower layer from the first movable waveguide at the upper layer for outputting.

Optionally, as shown in FIG. 7, the first movable waveguide 340 may have no support component, and the actuator drives the entire first movable waveguide 340 to perpendicularly move relative to the first plane. In this case, the locations and the quantity of the disposed actuators may be shown in FIG. 7, in which the actuators are disposed at two ends of the first movable waveguide 340. Alternatively, the actuator may be disposed at another location, for example, disposed in the middle of the first movable waveguide 340, to drive the entire first movable waveguide 340 to perpendicularly move relative to the first plane.

Figure 8:
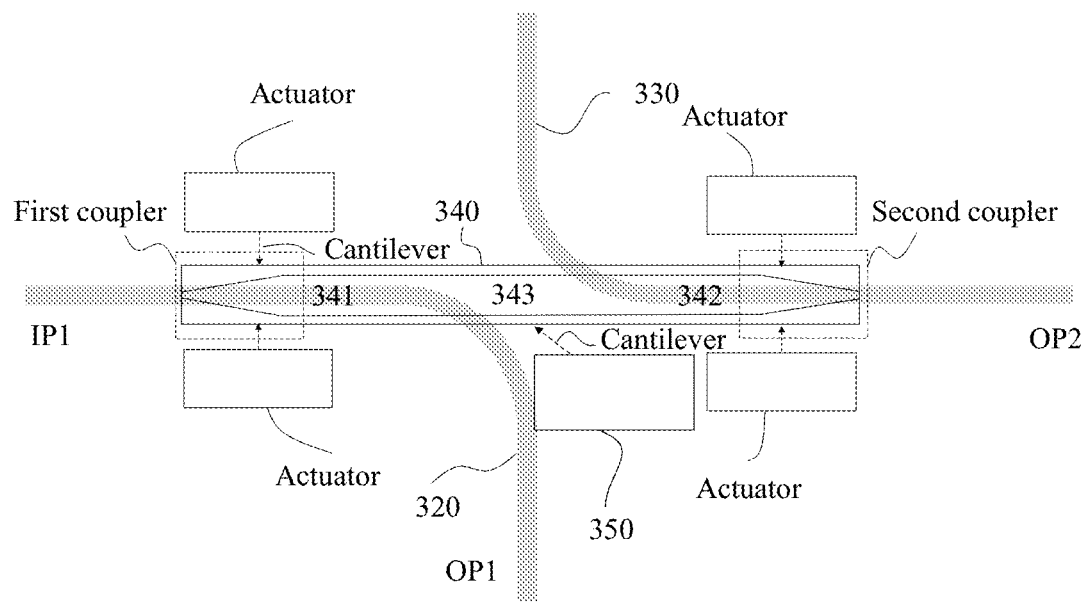
FIG. 8 is a schematic structural block diagram of an optical switch according to another embodiment of this application.

Optionally, as shown in FIG. 8, the first movable waveguide 340 may further include a connecting section 343, configured to connect the first input section 341 and the first output section 342. The optical switch 300 further includes a support component 350, configured to connect to the connecting section 343, so that a middle section of the first movable waveguide 340 is fixed relative to the substrate 310, and the two ends of the first movable waveguide 340 can perpendicularly move relative to the first plane. In this way, the actuator drives the two ends of the first movable waveguide 340 to perpendicularly move relative to the first plane, and the middle section of the first movable waveguide 340 stays still, so that the first movable waveguide 340 deforms in the direction perpendicular to the first plane. The support component makes the first movable waveguide firmer and easier to be controlled by the actuator.

It should be understood that, in the embodiments of this application, the support component 350 may be a meshed component made of a thin silicon film shown in FIG. 9. A meshed structure makes the support component 350 high in stiffness, light in weight, and easy to process. Locations and a quantity of support components 350 may be flexibly set based on a requirement. For example, as shown in FIG. 8, one support component may be disposed at a middle location of the first movable waveguide 340; or as shown in FIG. 9, two support components are disposed at corresponding locations. A specific form of the support component is not limited in this embodiment of this application.

The foregoing describes a 1×2 (one input port and two output ports) optical switch in the embodiments of this application in detail, and the following focuses on a 2×2 (two input ports and two output ports) optical switch in the embodiments of this application.

Figure 10:
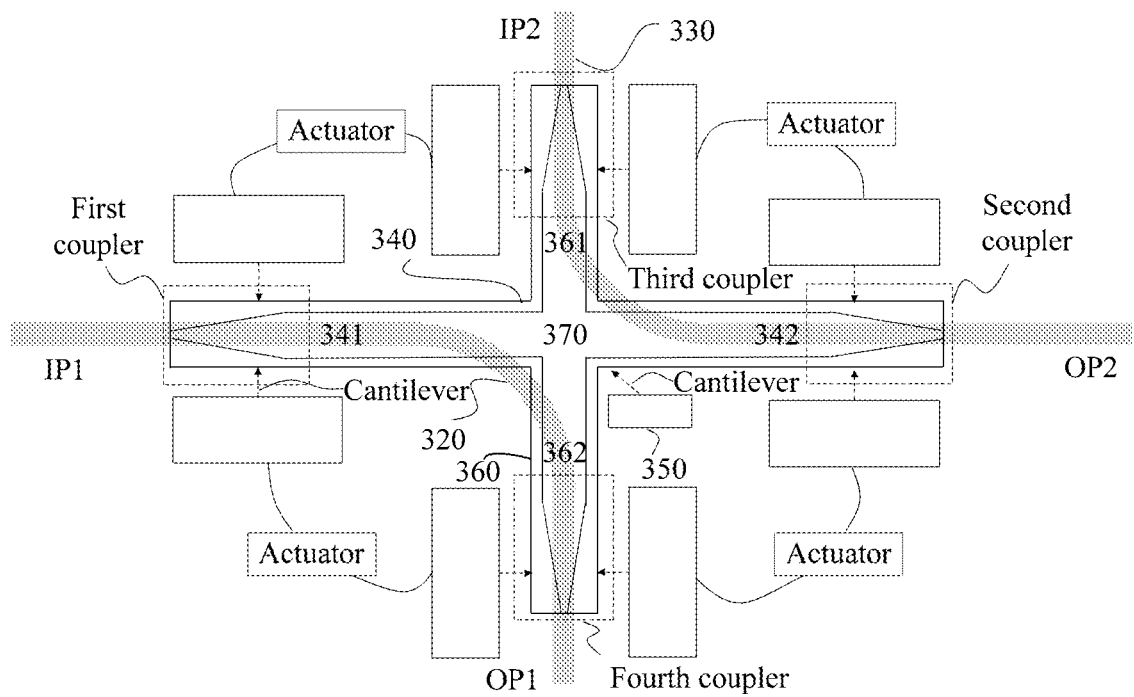
FIG. 10 is a schematic structural block diagram of an optical switch according to another embodiment of this application.
Figure 11:
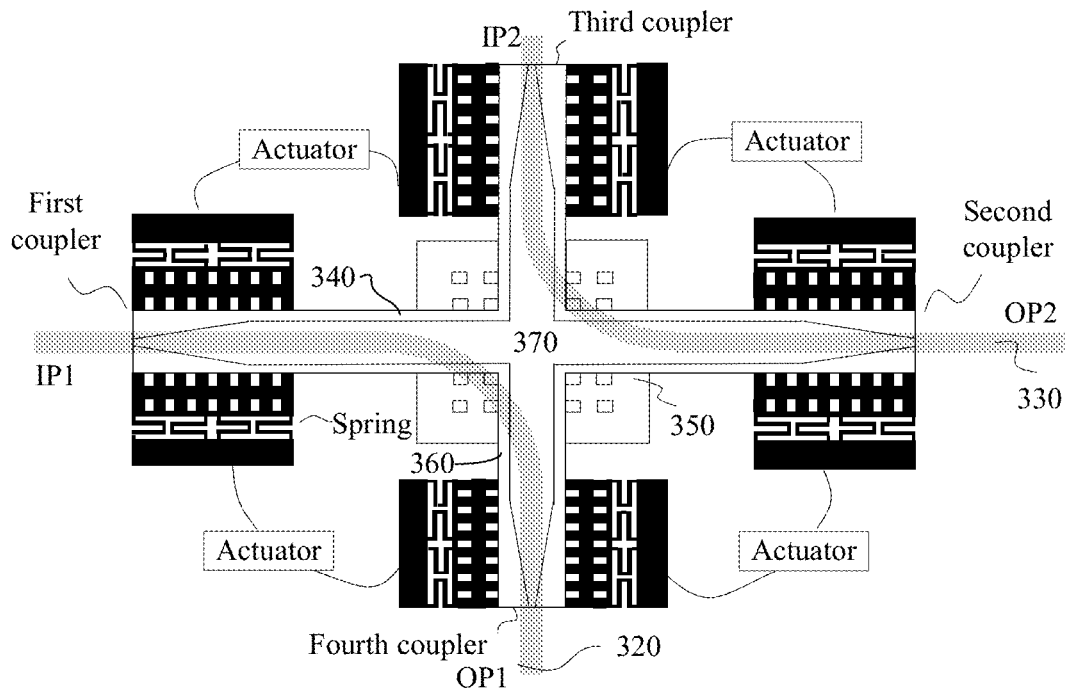
FIG. 11 is a schematic structural block diagram of an optical switch according to another embodiment of this application.
Figure 12:
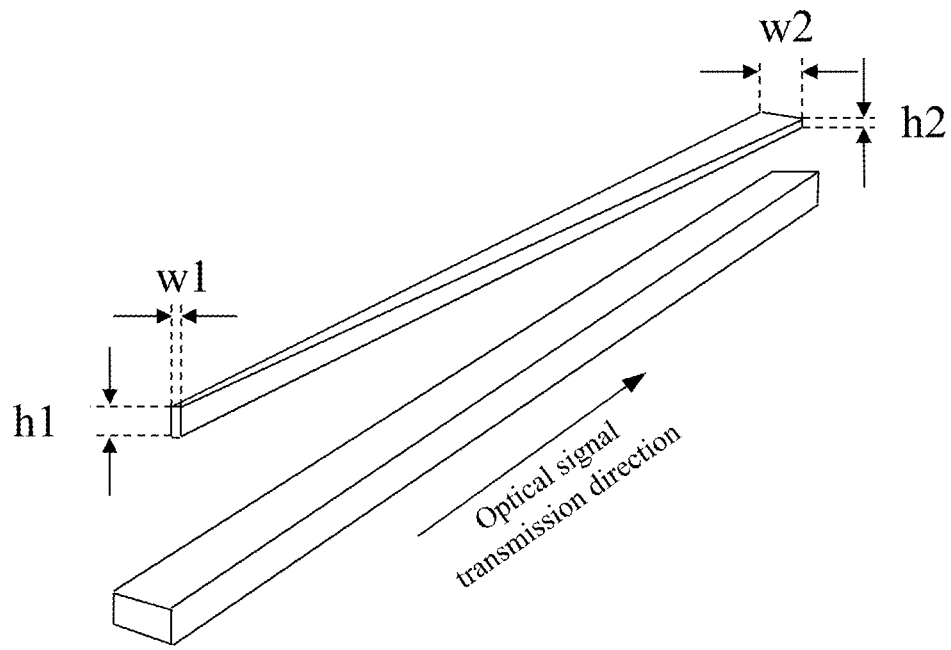
FIG. 12 is a schematic structural block diagram of a coupler according to an embodiment of this application.
Figure 13:
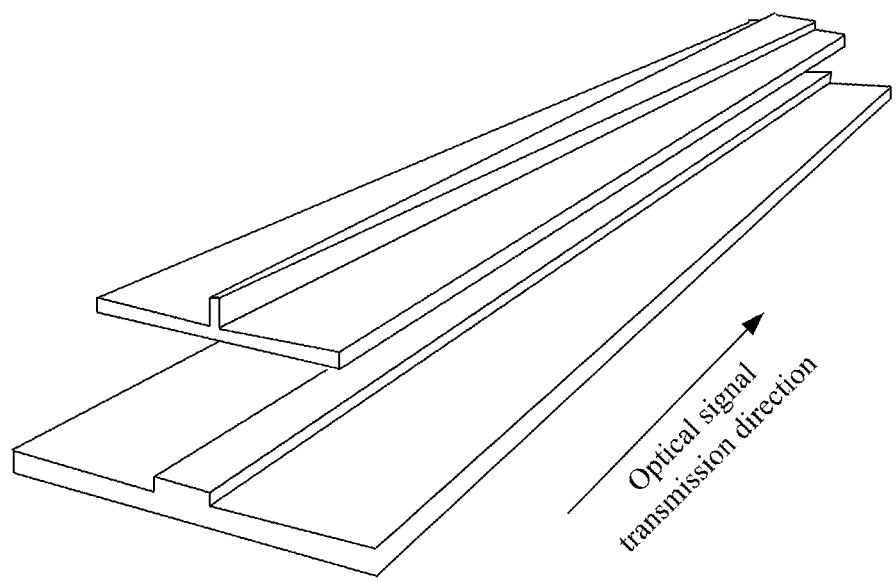
FIG. 13 is a schematic structural block diagram of a coupler according to another embodiment of this application.

The 2×2 optical switch can be obtained based on a structure of the 1×2 optical switch that is described above. As shown in FIG. 10 and FIG. 11, the second waveguide 330 further has a second input port IP2, the optical switch further includes a second movable waveguide 360, and the first movable waveguide 340 and the second movable waveguide 360 intersect. When the second movable waveguide 360 is at a third location, (1) the second movable waveguide 360 and the first waveguide 320 are optically decoupled, and the second movable waveguide 360 and the second waveguide 330 are optically decoupled; and (2) the IP2 and an OP2 are optically connected, and the IP2 and an OP1 are optically disconnected. When the second movable waveguide 360 is at a fourth location, (1) the second movable waveguide 360 and the first waveguide 320 are optically coupled, and the second movable waveguide 360 and the second waveguide 330 are optically coupled; and (2) the IP2 and the OP2 are optically disconnected, and the IP2 and the OP1 are optically connected by using the second movable waveguide 360.

Specifically, the second movable waveguide 360 may include a second input section 361 and a second output section 362, and transmission of an optical signal in a path from the first input section 341 to the first output section 342 intersects with transmission of an optical signal in a path from the second input section 361 to the second output section 362. When the second movable waveguide 360 is at the third location, the IP2 and the OP2 are optically connected, and the IP2 and the OP1 are optically disconnected. When the second movable waveguide 360 is at the fourth location, the second input section 361 of the second movable waveguide 360 and the second waveguide 330 form a third coupler, and the second output section 362 of the second movable waveguide 360 and the first waveguide 320 form a fourth coupler. Because of the third coupler, the IP2 and the OP2 are optically disconnected, and because of the fourth coupler, the IP2 and the OP1 are optically connected.

In the 2×2 optical switch, the first movable waveguide 340 and the second movable waveguide 360 may or may not perpendicularly intersect. This is not limited in this embodiment of this application.

When the optical switch is in a through state, that is, when the first movable waveguide 340 is at the first location and the second movable waveguide 360 is at the third location, the first movable waveguide 340 is relatively far away from the first waveguide 320 and the second waveguide 330, and the first movable waveguide 340 is optically decoupled from the first waveguide 320 and the second waveguide 330. Likewise, the second movable waveguide 360 is optically decoupled from the first waveguide 320 and the second waveguide 330. The IP1 and the OP1 are optically connected, and the IP1 and the OP2 are optically disconnected. The IP2 and the OP2 are optically connected, and the IP2 and the OP1 are optically disconnected. Input light 1 is input from the first input port IP1 of the first waveguide 320 and is transmitted in the first waveguide 320, and output light 1 is output from the first output port OP1 of the first waveguide 320. Input light 2 is input from the second input port IP2 of the second waveguide 330 and is transmitted in the second waveguide 330, and output light 2 is output from the second output port OP2 of the second waveguide 330.

When the optical switch is in a drop state, that is, when the first movable waveguide 340 is at the second location and the second movable waveguide 360 is at the fourth location, the first movable waveguide 340 is relatively close to the first waveguide 320 and the second waveguide 330, and the first movable waveguide 340 is optically coupled to the first waveguide 320 and the second waveguide 330. Likewise, the second movable waveguide 360 is optically coupled to the first waveguide 320 and the second waveguide 330. The IP1 and the OP1 are optically disconnected, and the IP1 and the OP2 are optically connected by using the first movable waveguide 340. The IP2 and the OP2 are optically disconnected, and the IP2 and the OP1 are optically connected by using the second movable waveguide 360. Input light 1 is input from the first input port IP1 of the first waveguide 320. Because the first movable waveguide 340 and the first waveguide 320 are optically coupled, an optical signal 1 is coupled into the first movable waveguide 340 for transmission. In addition, because the first movable waveguide 340 and the second waveguide 330 are optically coupled, the optical signal 1 is coupled into the second waveguide 330 for transmission. Finally, output light 1 is output from the second output port OP2 of the second waveguide 330. Likewise, input light 2 is input from the second input port IP2 of the second waveguide 330, and output light 2 is output from the first output port OP1 of the first waveguide 320. In addition, similar to the 1×2 optical switch, because of the third coupler, the IP2 and the OP2 are optically disconnected, and because of the fourth coupler, the IP2 and the OP1 are optically connected. Details are not described herein.

Optionally, as shown in FIG. 10 and FIG. 11, the 2×2 optical switch may further include a cross connecting section 370, configured to connect to the first input section 341, the first output section 342, the second input section 361, and the second output section 362. The optical switch further includes the support component 350, configured to connect to the connecting section 370, so that the middle section of the first movable waveguide 340 and a middle section of the second movable waveguide 360 are fixed relative to the substrate 310, and the two ends of the first movable waveguide 340 and two ends of the second movable waveguide 360 can perpendicularly move relative to the first plane. Likewise, in this way, the actuator drives the two ends of the first movable waveguide 340 and the two ends of the second movable waveguide 360 to perpendicularly move relative to the first plane, and the middle section of the first movable waveguide 340 and the middle section of the second movable waveguide 360 stay still, so that the first movable waveguide 340 and the second movable waveguide 360 deform in the direction perpendicular to the first plane.

Optionally, the 2×2 optical switch may not include a support component. This is not limited in this embodiment of this application.

The couplers (including the first coupler to the fourth coupler) in the embodiments of this application may be directional couplers or adiabatic couplers. For the directional coupler, the first movable waveguide and the fixed waveguide are usually equal in width at a coupling section. For an adiabatic coupler, usually, a height or a width of an upper-layer waveguide or a distance between an upper-layer waveguide and a lower-layer waveguide may gradually change in a transmission direction of an optical signal. For example, for a coupler shown in FIG. 12, along the transmission direction of the optical signal, an upper-layer waveguide gradually changes from a width w1 and a height h1 to a width w2 and a height h2, where w1<w2, and h1>h2. That is, the upper-layer waveguide is a tapered waveguide, and may correspond to the first input section 341, the first output section 342, the second input section 361, and the second output section 362 in the foregoing description. The lower-layer waveguide is a strip waveguide, and corresponds to corresponding sections of the first waveguide 320 and the second waveguide 330 in the foregoing description. The adiabatic couplers can implement transmission in a relatively wide spectral range, so that an optical signal is more stable. In addition, a process tolerance of a coupler can be improved, and performance of the optical switch can be improved.

Based on the adiabatic coupler, shapes of the upper-layer waveguide and the lower-layer waveguide may be further improved. An improved upper-layer waveguide and an improved lower-layer waveguide may be ridge optical waveguides shown in FIG. 13. The ridge optical waveguide can not only reduce a transmission loss of an optical signal, but also improve mechanical performance of a structure, thereby improving performance of the optical switch.

Optionally, in another embodiment of this application, the first movable waveguide 340 is located in the first plane, and the first movable waveguide 340 can rotate in the first plane around a rotation axis perpendicular to the first plane. In this embodiment of this application, the first movable waveguide and the two fixed waveguides are located in a same plane or at a same layer, so that difficulty of a fabrication process is greatly reduced.

Figure 14:
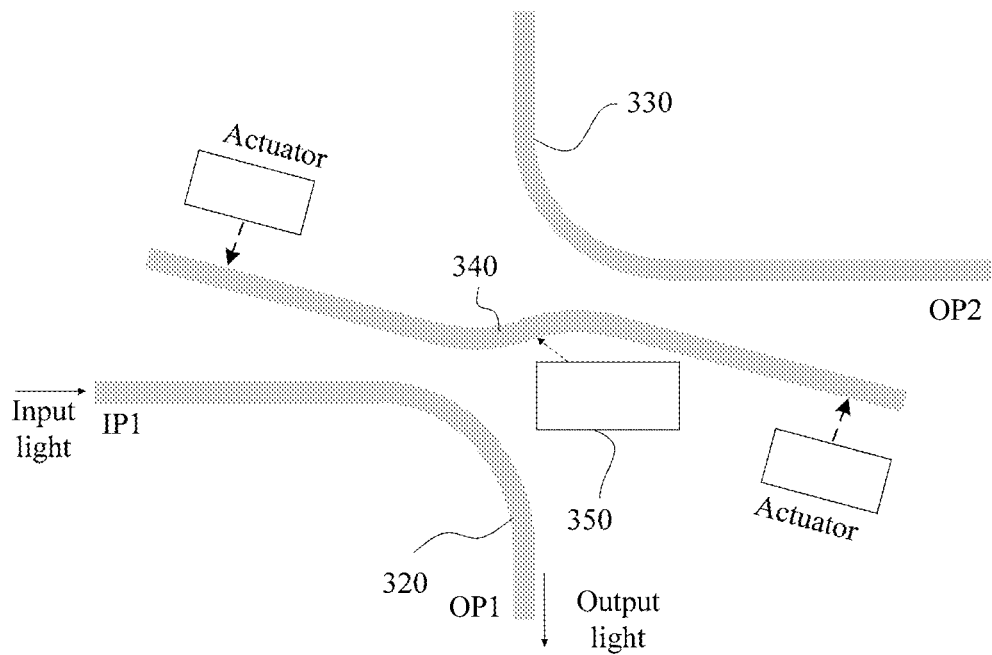
FIG. 14 is a schematic block diagram of an optical switch in a through state according to another embodiment of this application.
Figure 15:
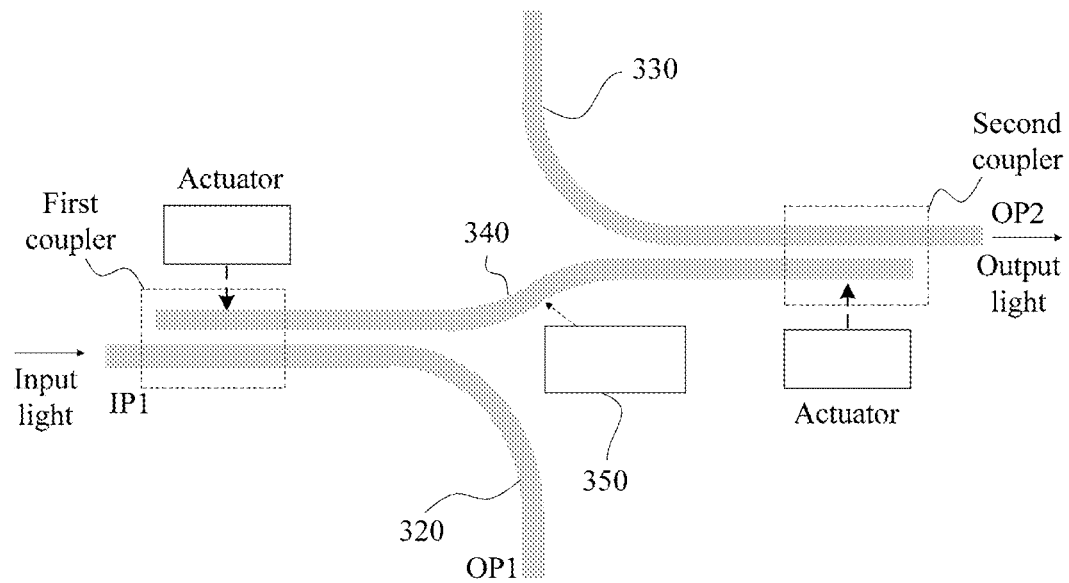
FIG. 15 is a schematic block diagram of an optical switch in a drop state according to another embodiment of this application.

Specifically, as shown in FIG. 14 and FIG. 15, FIG. 14 shows an optical switch in a through state, and FIG. 15 shows an optical switch in a drop state. From the through state to the drop state, a first movable waveguide 340 can rotate, in a first plane under control of an actuator, from a first location at which a first movable waveguide 340 is optically decoupled from a first waveguide 320 and a second waveguide 330, to a second location at which the first movable waveguide 340 is optically coupled to the first waveguide 320 and the second waveguide 330. There may be a support component in the middle section of the first movable waveguide 340 to make the first movable waveguide 340 firm, to ensure reliability of the optical switch. In addition, the support component should be a rotation axis, so that the first movable waveguide 340 can rotate by using the rotation axis as a central axis.

Figure 16:
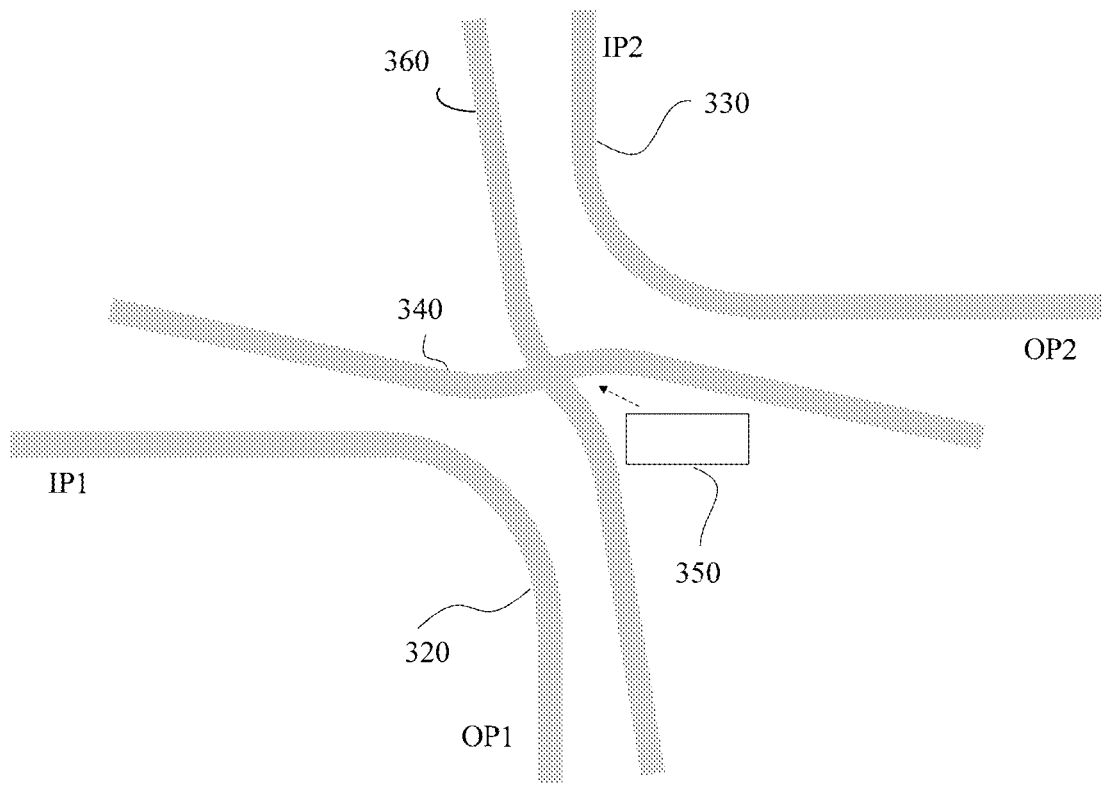
FIG. 16 is a schematic block diagram of an optical switch in a through state according to another embodiment of this application.
Figure 17:
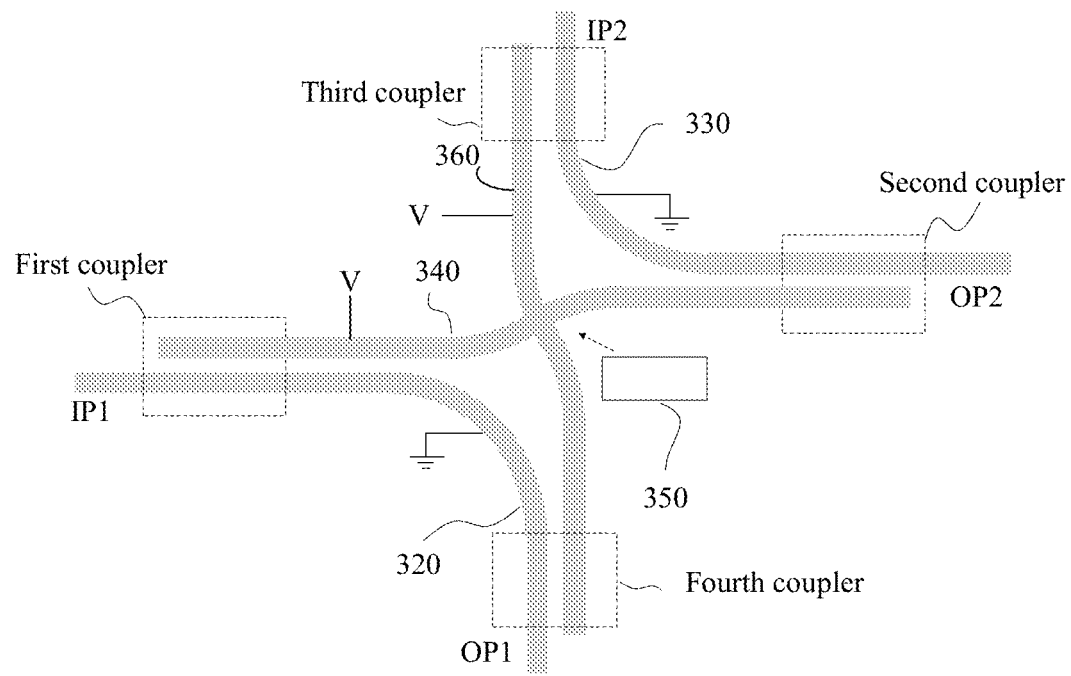
FIG. 17 is a schematic block diagram of an optical switch in a drop state according to another embodiment of this application.

FIG. 16 and FIG. 17 are respectively schematic diagrams of a 2×2 optical switch in a through state and a drop state when a first movable waveguide 340 and a second movable waveguide 360 move in a rotating manner. The first movable waveguide 340 and the second movable waveguide 360 use a voltage difference from the two fixed waveguides as driving force of the rotation. Specifically, as shown in FIG. 17, the first waveguide 320 and the second waveguide 330 are grounded, and voltages V are applied to the first movable waveguide 340 and the second movable waveguide 360. Because of the voltage difference, the first movable waveguide 340 and the second movable waveguide 360 rotate by using the support component 350 as a rotation axis, and two ends of the first movable waveguide 340 and two ends of the second movable waveguide 360 respectively move towards corresponding sections of the first waveguide 320 and the second waveguide 330 to form couplers, thereby switching the optical switch to the drop state. A transmission path of an optical signal is similar to that in the foregoing description. Details are not described herein again.

In the embodiments of this application, the first waveguide 320 and the second waveguide 330 may both be curved waveguides, and the curved waveguide is an arc-shaped optical waveguide or a curvature-gradient optical waveguide. This can reduce a loss of the optical signal during transmission in the optical waveguide. Alternatively, the first waveguide 320 and the second waveguide 330 may be optical waveguides of another shape, and this is not limited in this embodiment of this application. When the first waveguide 320 and the second waveguide 330 are curved waveguides, the first movable waveguide 340 may be a straight waveguide or a nearly straight waveguide, and this is not limited in this embodiment of this application.

In the embodiments of this application, the optical switch may further include an optical power monitor. The optical power monitor is configured to monitor optical power of at least one of the first waveguide, the second waveguide, the IP1, the OP1, or the OP2. The optical switch in the embodiments of this application monitors power of an optical signal in each element, so as to estimate a location of the first movable waveguide 340 based on the power of the optical signal, thereby controlling the location of the first movable waveguide 340 more accurately.

Based on the optical switch in the embodiments of this application, this application further provides an optical switching system. The optical switching system is an M×N optical switch matrix, including M×N optical switches. Each optical switch may be the optical switch shown in FIG. 4 to FIG. 9 or the optical switch shown in FIG. 14 and FIG. 15 (a second waveguide 330 of these optical switches further has a second input port IP2), or may be the 2×2 optical switch shown in FIG. 10, FIG. 11, FIG. 16, and FIG. 17. Each optical switch is denoted as $SC_{i,j}$, where a value of i is 1, 2, ..., M, and a value of j is 1, 2, ..., N. The M×N optical switches are set as follows: (1) An $IP1_{i,j}$ and an $OP2_{i,j-1}$ are optically connected; and (2) an $IP2_{i,j}$ and an $OP1_{i-1,j}$ are optically connected, where a value range of i is 2 to M, and a value range of j is 2 to N.

At least one path that includes only one optical switch whose first movable waveguide is at a first location exists between an $IP1_{i,1}$ and an $OP1_{M,j}$. Alternatively, at least one path that includes only one first waveguide exists between the $IP1_{i,1}$ and the $OP1_{M,j}$.

When an optical switch in the matrix is the 2×2 optical switch shown in FIG. 10, FIG. 11, FIG. 16, and FIG. 17, at least one path that includes only one optical switch whose first movable waveguide is at a first location exists between the $IP1_{i,1}$ and the $OP1_{M,j}$, and at least one path that includes only one optical switch whose second movable waveguide is at a third location exists between an $IP2_{1,j}$ and an $OP2_{i,N}$. Alternatively, at least one path that includes only one first waveguide exists between the $IP1_{1,j}$ and the $OP1_{M,j}$, and at least one path that includes only one second waveguide exists between the $IP2_{1,j}$ and the $OP2_{i,N}$, where a value range of i is 1 to M, and a value range of j is 1 to N.

Figure 18:
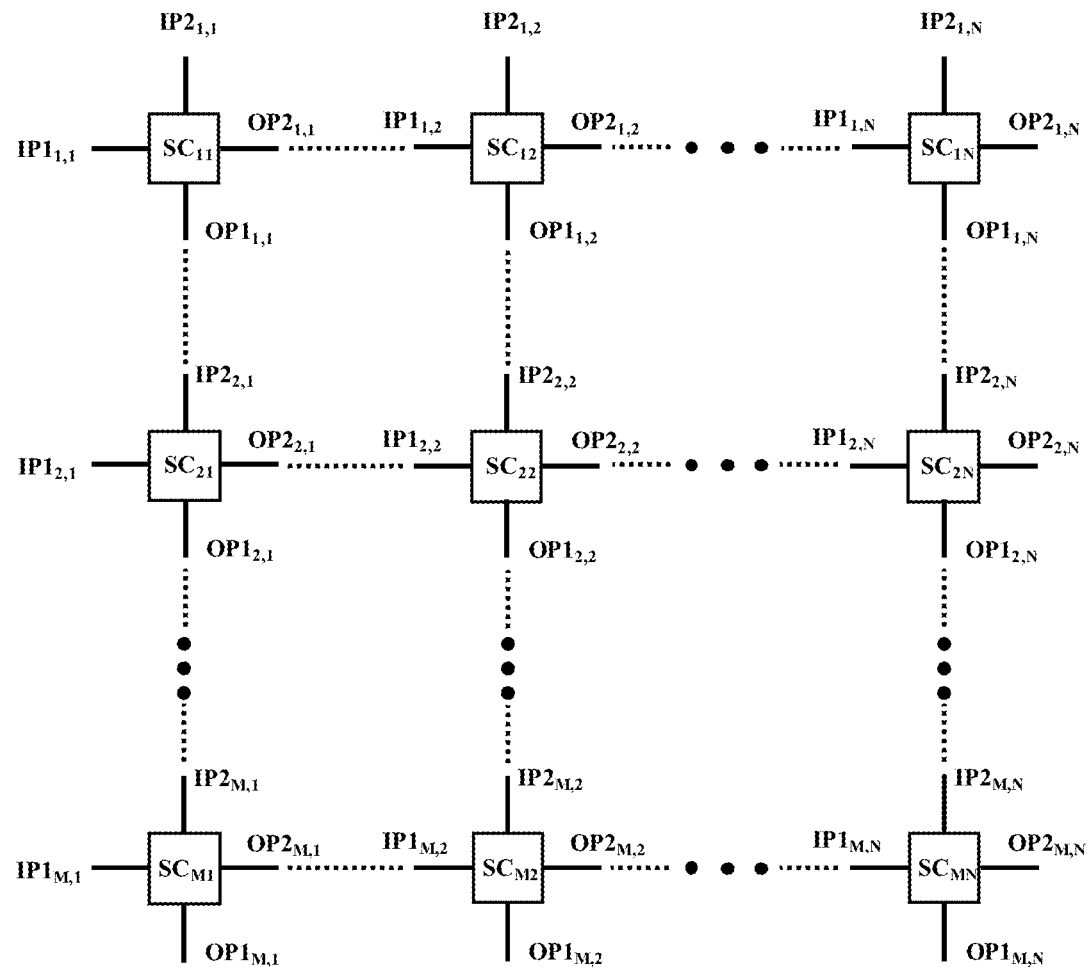
FIG. 18 is a schematic structural block diagram of an optical switching system according to an embodiment of this application.

Specifically, a connection relationship between the optical switches in the M×N optical switch matrix may be shown in FIG. 18. For example, at least one path (for example, from $SC_{21}$ to $SC_{22}$, $SC_{2N}$, $SC_{3N}$, and $SC_{MN}$) that includes only one optical switch $SC_{2N}$ whose first movable waveguide is at a first location exists between an $IP2_{2,1}$ and an $OP1_{M,N}$, or an optical path includes only one first waveguide (a first waveguide of $SC_{2N}$).

For another example, at least one path (for example, from $SC_{11}$ to $SC_{12}$ and $SC_{1N}$) that includes only one optical switch $SC_{11}$ whose second movable waveguide is at a third location exists between an $IP2_{1,1}$ and an $OP2_{1,N}$, or an optical path includes only one second waveguide (a second waveguide of $SC_{11}$).

The optical switching system in this embodiment of this application can implement a microsecond-level switching speed and has advantages such as a low insertion loss, a large quantity of ports, and low costs.

It should be noted that, based on the optical switch in the embodiments of this application, an optical switching system having another variant connection relationship may be formed through connection. For example, changing directions of an input port and an output port of the optical switching system in FIG. 18 may be implemented by making a corresponding change to the connection relationship between the optical switches. Details are not described herein.

Figure 19:
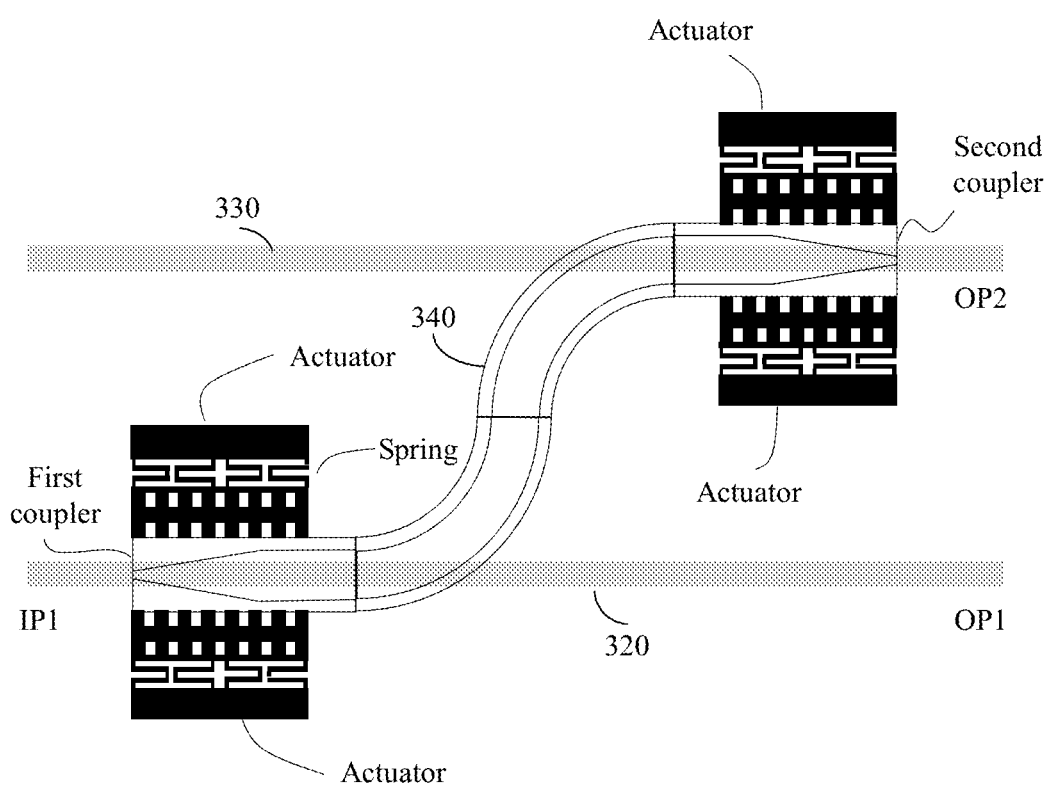
FIG. 19 is a schematic structural block diagram of an optical switch according to another embodiment of this application.

The first waveguide and the second waveguide in the optical switch shown in the foregoing figures are both curved waveguides. Alternatively, the first waveguide and the second waveguide may be optical waveguides of another shape, for example, may be straight waveguides shown in FIG. 19. As shown in FIG. 19, a first waveguide 320 and a second waveguide 330 are two straight waveguides that do not intersect. As shown in FIG. 19, a first movable waveguide 340 may be a waveguide having a curved section and a straight section. The first movable waveguide 340 may not be located in the first plane, and the first movable waveguide 340 can perpendicularly move relative to the first plane or can deform in a direction perpendicular to the first plane, to be optically decoupled from or optically coupled to the first waveguide 320 and the second waveguide 330, thereby controlling a through state and a drop state of the optical switch.

By using a specific example, FIG. 19 shows an actuator, a spring connecting the actuator and a movable waveguide, and a first coupler and a second coupler that are formed when the movable waveguide and fixed waveguides are optically coupled. It should be understood that all the foregoing components are examples instead of limitations.

In addition, the first waveguide 320 and the second waveguide 330 are two straight waveguides that do not intersect. The first movable waveguide 340 may be located in the first plane, and the first movable waveguide 340 can horizontally move in the first plane. A specific principle of the optical switch is similar to that in the foregoing description. Details are not described herein again.

Based on an expansion manner similar to the manner mentioned in the foregoing description, a 2×2 optical switch may be obtained from the 1×2 optical switch shown in FIG. 19. When the 2×2 optical switch and a similar optical switch whose fixed waveguides are straight waveguides form an optical switch matrix, an extra curved optical waveguide needs to be added, to form a crossbar structure through connection.

It should be understood that the first, the second, the third, the fourth, and various numbers in this specification are used for differentiation only for ease of description, instead of limiting the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one location, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical switch, wherein the optical switch is disposed on a substrate, and the optical switch comprises a first waveguide, a second waveguide, and a first movable waveguide;
the first waveguide is immovable relative to the substrate, and the first waveguide has a first input port IP1 and a first output port OP1;
the second waveguide is immovable relative to the substrate, the second waveguide has a second output port OP2, the first waveguide and the second waveguide are located in a first plane, and the first waveguide and the second waveguide do not intersect;
the first movable waveguide is movable relative to the substrate;
the first waveguide and the second waveguide are both curved waveguides, and the first movable waveguide is a straight waveguide;
when the first movable waveguide is at a first location, (1) the first movable waveguide and the first waveguide are optically decoupled, and the first movable waveguide and the second waveguide are optically decoupled; and (2) the IP1 and the OP1 are optically connected, and the IP1 and the OP2 are optically disconnected; and
when the first movable waveguide is at a second location, (1) the first movable waveguide and the first waveguide are optically coupled, and the first movable waveguide and the second waveguide are optically coupled; and (2) the IP1 and the OP1 are optically disconnected, and the IP1 and the OP2 are optically connected by using the first movable waveguide;
the first movable waveguide comprises a first input section and a first output section, and when the first movable waveguide is at the second location, the first input section of the first movable waveguide and the first waveguide form a first coupler, and the first output section of the first movable waveguide and the second waveguide form a second coupler;
the first movable waveguide further comprises a connecting section configured to connect the first input section and the first output section, and the optical switch further comprises a support component, configured to connect to the connecting section, so that a middle section of the first movable waveguide is fixed relative to the substrate, and two ends of the first movable waveguide perpendicularly move relative to the first plane.

2. The optical switch according to claim 1, wherein the first movable waveguide is not located in the first plane, and the first movable waveguide perpendicularly moves relative to the first plane or deforms in a direction perpendicular to the first plane.

3. The optical switch according to claim 1, wherein the first movable waveguide is located in the first plane, and the first movable waveguide rotates in the first plane around a rotation axis perpendicular to the first plane.

4. The optical switch according to claim 1, wherein the second waveguide further has a second input port IP2, the optical switch further comprises a second movable waveguide, and the first movable waveguide and the second movable waveguide intersect;
when the second movable waveguide is at a third location, (1) the second movable waveguide and the first waveguide are optically decoupled, and the second movable waveguide and the second waveguide are optically decoupled; and (2) the IP2 and the OP2 are optically connected, and the IP2 and the OP1 are optically disconnected; and
when the second movable waveguide is at a fourth location, (1) the second movable waveguide and the first waveguide are optically coupled, and the second movable waveguide and the second waveguide are optically coupled; and (2) the IP2 and the OP2 are optically disconnected, and the IP2 and the OP1 are optically connected by using the second movable waveguide.

5. The optical switch according to claim 4, wherein the first movable waveguide comprises the first input section and the first output section, the second movable waveguide comprises a second input section and a second output section, the optical switch further comprises a cross connecting section, configured to connect to the first input section, the first output section, the second input section, and the second output section, and the optical switch further comprises a support component, configured to connect to the connecting section, so that a middle section of the first movable waveguide and a middle section of the second movable waveguide are fixed relative to the substrate, and two ends of the first movable waveguide and two ends of the second movable waveguide perpendicularly move relative to the first plane.

6. The optical switch according to claim 1, wherein the support component is a meshed component made of a thin silicon film.

7. The optical switch according to claim 1, wherein the curved waveguide is an arc-shaped optical waveguide or a curvature-gradient optical waveguide.

8. The optical switch according to claim 1, wherein the optical switch further comprises at least one actuator, a location of the first movable waveguide is controlled by the at least one actuator, and the at least one actuator and the first movable waveguide are connected to each other by using a cantilever.

9. The optical switch according to claim 1, wherein the optical switch further comprises an optical power monitor, and the optical power monitor is configured to monitor optical power of at least one of the first waveguide, the second waveguide, the IP1, the OP1, or the OP2.

10. An optical switching system, wherein the optical switching system is an M×N optical switch matrix, comprising M×N optical switches, wherein the optical switch is disposed on a substrate, and the optical switch comprises a first waveguide, a second waveguide, and a first movable waveguide;
the first waveguide is immovable relative to the substrate, and the first waveguide has a first input port IP1 and a first output port OP1;
the second waveguide is immovable relative to the substrate, the second waveguide has a second output port OP2, the first waveguide and the second waveguide are located in a first plane, and the first waveguide and the second waveguide do not intersect;
the first movable waveguide is movable relative to the substrate;

the first waveguide and the second waveguide are both curved waveguides, and the first movable waveguide is a straight waveguide;

when the first movable waveguide is at a first location, (1) the first movable waveguide and the first waveguide are optically decoupled, and the first movable waveguide and the second waveguide are optically decoupled; and (2) the IP1 and the OP1 are optically connected, and the IP1 and the OP2 are optically disconnected; and when the first movable waveguide is at a second location, (1) the first movable waveguide and the first waveguide are optically coupled, and the first movable waveguide and the second waveguide are optically coupled; and (2) the IP1 and the OP1 are optically disconnected, and the IP1 and the OP2 are optically connected by using the first movable waveguide, the first movable waveguide comprises a first input section and a first output section, and when the first movable waveguide is at the second location, the first input section of the first movable waveguide and the first waveguide form a first coupler, and the first output section of the first movable waveguide and the second waveguide form a second coupler;

the first movable waveguide further comprises a connecting section configured to connect the first input section and the first output section, and the optical switch further comprises a support component, configured to connect to the connecting section, so that a middle section of the first movable waveguide is fixed relative to the substrate, and two ends of the first movable waveguide perpendicularly move relative to the first plane;

the second waveguide of the optical switch further comprises a second input port IP2, and each optical switch is denoted as $SC_{i,j}$, wherein a value of i is 1, 2, . . . , M, and a value of j is 1, 2, . . . , N; and the M×N optical switches are set as follows: (1) an $IP1_{i,j}$ and an $OP2_{i,j-1}$ are optically connected; and (2) an $IP2_{i,j}$ and an $OP1_{i-1,j}$ are optically connected, wherein a value range of i is 2 to M, and a value range of j is 2 to N.

11. The optical switching system according to claim 10, wherein at least one path that comprises only one optical switch whose first movable waveguide is at a first location exists between an $IP1_{i,1}$ and an $OP1_{M,j}$, wherein a value range of i is 1 to M, and a value range of j is 1 to N.

12. The optical switching system according to claim 10, wherein the first movable waveguide is not located in the first plane, and the first movable waveguide perpendicularly moves relative to the first plane or deforms in a direction perpendicular to the first plane.

13. The optical switching system according to claim 10, wherein the first movable waveguide is located in the first plane, and the first movable waveguide rotates in the first plane around a rotation axis perpendicular to the first plane.

14. The optical switching system according to claim 10, wherein the second waveguide further has a second input port IP2, the optical switch further comprises a second movable waveguide, and the first movable waveguide and the second movable waveguide intersect;

when the second movable waveguide is at a third location, (1) the second movable waveguide and the first waveguide are optically decoupled, and the second movable waveguide and the second waveguide are optically decoupled; and (2) the IP2 and the OP2 are optically connected, and the IP2 and the OP1 are optically disconnected; and when the second movable waveguide is at a fourth location, (1) the second movable waveguide and the first waveguide are optically coupled, and the second movable waveguide and the second waveguide are optically coupled; and (2) the IP2 and the OP2 are optically disconnected, and the IP2 and the OP1 are optically connected by using the second movable waveguide.

15. The optical switching system according to claim 14, wherein the first movable waveguide comprises the first input section and the first output section, the second movable waveguide comprises a second input section and a second output section, the optical switch further comprises a cross connecting section, configured to connect to the first input section, the first output section, the second input section, and the second output section, and the optical switch further comprises a support component, configured to connect to the connecting section, so that a middle section of the first movable waveguide and a middle section of the second movable waveguide are fixed relative to the substrate, and two ends of the first movable waveguide and two ends of the second movable waveguide perpendicularly move relative to the first plane.

16. The optical switching system according to claim 10, wherein the support component is a meshed component made of a thin silicon film.

* * * * *